US011086692B2

(12) United States Patent
Morley et al.

(10) Patent No.: US 11,086,692 B2
(45) Date of Patent: *Aug. 10, 2021

(54) MULTIPLATFORM MANAGEMENT SYSTEM AND METHOD FOR MOBILE DEVICES

(71) Applicant: BlackBerry Limited, Waterloo (CA)

(72) Inventors: Paul Douglas Morley, Corinth, TX (US); Michael Wayne Dennis, Sammamish, WA (US); Neil Andrew Billings, Mississauga (CA); Aleksandar Susnjar, Mississauga (CA)

(73) Assignee: BlackBerry Limited, Waterloo (CA)

( * ) Notice: Subject to any disclaimer, the term of this patent is extended or adjusted under 35 U.S.C. 154(b) by 419 days.

This patent is subject to a terminal disclaimer.

(21) Appl. No.: 14/942,599

(22) Filed: Nov. 16, 2015

(65) Prior Publication Data

US 2016/0070606 A1 Mar. 10, 2016

Related U.S. Application Data

(63) Continuation of application No. 13/412,337, filed on Mar. 5, 2012, now Pat. No. 9,189,753.

(Continued)

(51) Int. Cl.
*G06F 15/16* (2006.01)
*G06F 9/54* (2006.01)
(Continued)

(52) U.S. Cl.
CPC .............. *G06F 9/541* (2013.01); *G06Q 10/00* (2013.01); *G06Q 10/06* (2013.01); *H04L 67/306* (2013.01)

(58) Field of Classification Search
CPC ....................................................... G06F 9/541
(Continued)

(56) References Cited

U.S. PATENT DOCUMENTS 6,401,085 B1   6/2002   Gershman et al.
6,714,987 B1   3/2004   Amin et al.
(Continued)

OTHER PUBLICATIONS

Summons to Attend Oral Proceedings Pursuant to Rule 115(1) EPC issued in EP Application No. 12178356.7 on Jan. 1, 2016; 9 pages.

(Continued)

*Primary Examiner* — Kevin T Bates
*Assistant Examiner* — Clarence D McCray
(74) *Attorney, Agent, or Firm* — Fish & Richardson P.C.

(57) ABSTRACT

Systems and methods for managing multiple wireless devices are disclosed. An exemplary system includes multiple domains each having a particular type of wireless device management system and respective (application programming interface) APIs. API call modules corresponding to each domain enable accessing of the APIs exposed by each of the respective domains. A management console enables compiling of a consolidated list of devices and users from each of the device management systems into a single view. An exemplary method includes querying multiple domains to obtain user information, compiling a consolidated list of users, displaying the consolidated list in a user interface, selecting a user from the consolidated list, and submitting a command to either all or a specific domain for the selected user.

22 Claims, 8 Drawing Sheets

Related U.S. Application Data

(60) Provisional application No. 61/550,830, filed on Oct. 24, 2011.

(51) Int. Cl.
  *G06Q 10/00* (2012.01)
  *G06Q 10/06* (2012.01)
  *H04L 29/08* (2006.01)

(58) Field of Classification Search
  USPC .......................................................... 709/223
  See application file for complete search history.

(56) References Cited

U.S. PATENT DOCUMENTS

| | | | |
|---|---|---|---|
| 6,721,713 | B1 | 4/2004 | Guheen et al. |
| 6,757,745 | B1 | 6/2004 | Hamann et al. |
| 7,103,656 | B2 | 9/2006 | Lewis et al. |
| 7,466,810 | B1 | 12/2008 | Quon et al. |
| 7,814,142 | B2 | 10/2010 | Mamou et al. |
| 7,921,309 | B1 | 4/2011 | Isbister et al. |
| 8,019,849 | B1 | 9/2011 | Lopilato et al. |
| 8,019,863 | B2 | 9/2011 | Jeide et al. |
| 8,020,104 | B2 | 9/2011 | Robarts et al. |
| 8,023,934 | B2 | 9/2011 | Jeide et al. |
| 8,041,760 | B2 | 10/2011 | Mamou et al. |
| 8,060,553 | B2 | 11/2011 | Mamou et al. |
| 8,156,183 | B2 | 4/2012 | Polis et al. |
| 8,255,932 | B1* | 8/2012 | Clemm ................ G06F 8/54 709/230 |
| 8,311,050 | B2 | 11/2012 | Katis et al. |
| 8,380,842 | B2 | 2/2013 | Bates et al. |
| 8,468,202 | B2 | 6/2013 | Polis et al. |
| 8,850,549 | B2 | 9/2014 | Beauregard et al. |
| 2003/0054810 | A1 | 3/2003 | Chen et al. |
| 2007/0124416 | A1 | 5/2007 | Casey et al. |
| 2007/0174410 | A1 | 7/2007 | Croft et al. |
| 2007/0275683 | A1* | 11/2007 | Songer ................ H04B 1/005 455/185.1 |
| 2008/0243525 | A1 | 10/2008 | Clark et al. |
| 2008/0255695 | A1* | 10/2008 | Brink .................... G06Q 10/00 700/108 |
| 2009/0010438 | A1* | 1/2009 | Gilb .................... H04L 63/104 380/277 |
| 2009/0083415 | A1 | 3/2009 | Tola et al. |
| 2009/0100529 | A1 | 4/2009 | Livnat et al. |
| 2009/0282125 | A1 | 11/2009 | Jeide et al. |
| 2010/0100952 | A1 | 4/2010 | Sample et al. |
| 2010/0317335 | A1 | 12/2010 | Borovsky |
| 2011/0113022 | A1* | 5/2011 | Polychronidis ....... H04L 67/306 707/705 |
| 2011/0238496 | A1 | 9/2011 | Gurbuxani et al. |
| 2012/0066411 | A1 | 3/2012 | Jeide et al. |
| 2012/0084803 | A1* | 4/2012 | Johansson ........ H04N 21/23106 725/25 |
| 2012/0191585 | A1 | 7/2012 | Lefebvre et al. |
| 2012/0214444 | A1 | 8/2012 | McBride et al. |
| 2012/0221955 | A1 | 8/2012 | Raleigh et al. |
| 2013/0029637 | A1 | 1/2013 | Hillier et al. |
| 2013/0084840 | A1 | 4/2013 | Luu et al. |
| 2013/0103816 | A1 | 4/2013 | Morley et al. |
| 2013/0132854 | A1 | 5/2013 | Raleigh et al. |

OTHER PUBLICATIONS

Office Action dated Jun. 5, 2014; in corresponding Canadian patent application No. 2,784,334.
Office Action issued in CA Application No. 2,784,334 dated Jun. 1, 2015; 3 pages.
European Search Report for EP 12178356.7, dated Dec. 14, 2012, 10 pages.
Office action in European App. No. 12178356.7 dated Mar. 7, 2014, 10 pages.
International Search Report for PCT/US2012/049183, dated Dec. 17, 2012, 3 pages.
International Preliminary Report on Patentability for PCT/US2012/049183, dated Apr. 29, 2014, 6 pages.

* cited by examiner

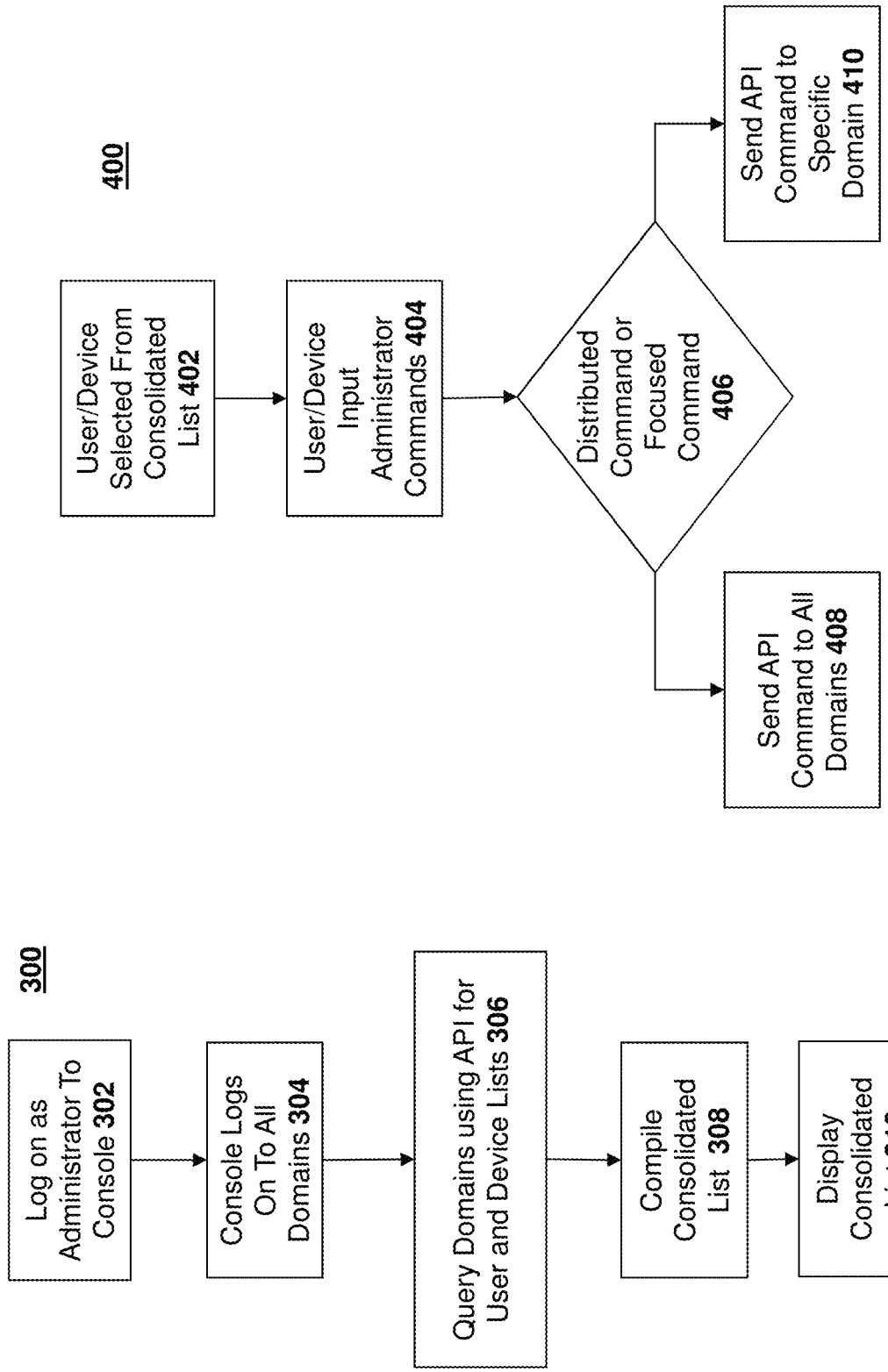

| Name | | Email address | MDM domain | Device model | PIN | Last contac... | + |
|---|---|---|---|---|---|---|---|
| Darby Paulsen | ▷ | Darby.Paulsen@TestCompa... | EU-BlackBerry | 9780 | F5C60000 | 04/29/2011 07:2... | |
| Mable Paul | ▷ | Mable.Paul@TestCompany... | EU-BlackBerry | 9780 | F1A17000 | 04/29/2011 07:0... | |
| Otilia Paulson | ▷ | Otilia.Paulson@TestCompan... | EU-BlackBerry | 9780 | F4361000 | 04/29/2011 07:1... | |
| Paul Morley | ▷ | pmorley@eap.testnet.rim.net | NA-BlackBerry | 9810 | 275D1D18 | 10/13/2011 03:4... | |
| Paul Morley | ▷ | pmorley@eap.testnet.rim.net | NA-PlayBook | Playbook 16GB | F2004001 | 10/13/2011 06:5... | |

Home > Paul Morley  MDM Domain 1
Paul Morley  MDM Domain 2 admin | Log out  ?
MDM Domains ▽

700

Activated device

Tablet
playbook
PIN
F620100P
Software version
2.0
State
Running

Last contact date
Wed. Oct 5th, 2011 08:34:03 AM
Last message sent
Wed. Oct 5th, 2011 08:34:03 AM
Last transaction sent to device
Delivered to device

Messaging statistics

| | |
|---|---|
| Forwarded messages | 0 |
| Sent messages | 2 |
| Pending data packets | 0 |

Managing devices

Specify device password and lock | Resend service books | Send IT policy | Delete all device data | Delete only work data

Device IT policy

Assigned IT Policy
Default

The Default IT policy includes all the standard IT policy rules that are set on the BlackBerry Playbook Administration Service.

IT Policy sent
Tue. Jan 4th, 2011 01:09:10 PM
Queued IT policy status
Applied successfully

Managing devices MDM Domain 2

MDM Domain
PB
Associated BlackBerry® Enterprise Server
FUSION

Groups
Assigned Groups

Messaging and synchronization

Email address
pmorley@testnet.net
Display name
Paul Morley

Messaging server
Mailbox
pmorley@testnet.net

FIG. 8

Home > Paul Morley  MDM Domain 1  MDM Domain 2
Paul Morley

800 besadmin | Log out  ?

MDM Domains ▽

Activated device

Smartphone
9810
Carrier
AT&T
PIN
275R1D1F
Phone number
19722222222
Software version
7.0.0 (Platform 5.0.0)
State
Running Last contact date
Thu. Oct 6th, 2011 03:01:32 PM
Last message sent
Thu. Oct 6th, 2011 03:01:32 PM
Last transaction sent to device
Received from device

Device activation

- Generate activation email message password
- Specify activation password
- Clear activation password

Managing devices

- Specify device password and lock
- Resend service books
- Send IT policy
- Delete all device data work data
- Delete only work data

Device IT policy

Assigned IT Policy
Factory
Factory

IT Policy sent
Thu. Oct 6th, 2011 11:18:43 AM
Queued IT policy status
Received

MDM Domains  MDM Domain 1

MDM Domain       Associated BlackBerry© Enterprise Server
NA-BlackBerry    BlackBerry

Groups

Assigned Groups

Messaging statistics

Forwarded messages | 18

`US 11,086,692 B2`

MULTIPLATFORM MANAGEMENT SYSTEM AND METHOD FOR MOBILE DEVICES

RELATED APPLICATIONS

The present application is a continuation of U.S. application Ser. No. 13/412,337, filed on Mar. 5, 2012, which is a non-provisional of U.S. Application No. 61/550,830, filed Oct. 24, 2011, the entire contents of which are incorporated herein by reference.

FIELD OF THE DISCLOSURE

The present disclosure relates to mobile devices and in particular to management systems and methods for mobile devices of differing types and platforms deployed within an organization.

BACKGROUND

Company employees increasingly use their choice of mobile devices to carry out mobile business processes. IT departments are therefore faced with the challenge of centrally managing several mobile platforms simultaneously. When an enterprise deploys mobile devices of different types and platforms, different management systems corresponding to the different devices and platforms are usually employed. This is typically because device manufacturers and vendors are interested in delivering mobile device management solutions that are specific to their own devices and that support their own product range. These systems allow an administrator to manage devices over-the-air, including activating devices, distributing software and applications, locking or wiping devices, enforcing and resetting device passwords, setting IT policies, and managing optional mobile applications for end users.

An organization wishing to deploy mobile devices from more than one manufacturer is faced with implementing and managing multiple management solutions. For example, different types of devices may run on different operating systems and therefore require different types of management systems suited to their respective operating systems. Furthermore, there may be different device platform capabilities, with some devices further limited by the design of their operating system. A challenge presented by this arrangement is that when an enterprise customer wants to provision different types of devices across its enterprise network it may have separate device management systems and configuration databases that correspond to the different types of devices.

Further problems occur if an employee is assigned one or multiple mobile devices; the person is usually represented by an "account" on each of the disparate management systems corresponding to the device type they have been given. This results in multiple "accounts" for the one person. A problem with this "multiple accounts/one user" situation arises when attempting to manage the "one" user and his/her "multiple devices" from a single management location.

Another difficulty presented by this arrangement is that the user and/or the enterprise network may have different requirements for each of the user's accounts on the different devices. Also, the enterprise network might impose different policies, permissions and guidelines for each device type even though the accounts on each device belong to the same user.

BRIEF DESCRIPTION OF THE DRAWINGS

The present disclosure will be better understood with reference to the drawings, in which:

FIG. 3 is a flow chart of a method for multiplatform management according to an embodiment of the present disclosure;

FIG. 4 is a flow chart of a method for multiplatform management according to another aspect of an embodiment of the present disclosure;

FIG. 6 is a screen showing display of a consolidated list of users according to an embodiment of the present disclosure;

FIG. 7 is a screen showing detail of a first domain for a selected user according to an embodiment of the present disclosure;

FIG. 8 is a screen showing detail of a second domain for a selected user according to an embodiment of the present disclosure.

DETAILED DESCRIPTION OF THE DRAWINGS

Figure 1:
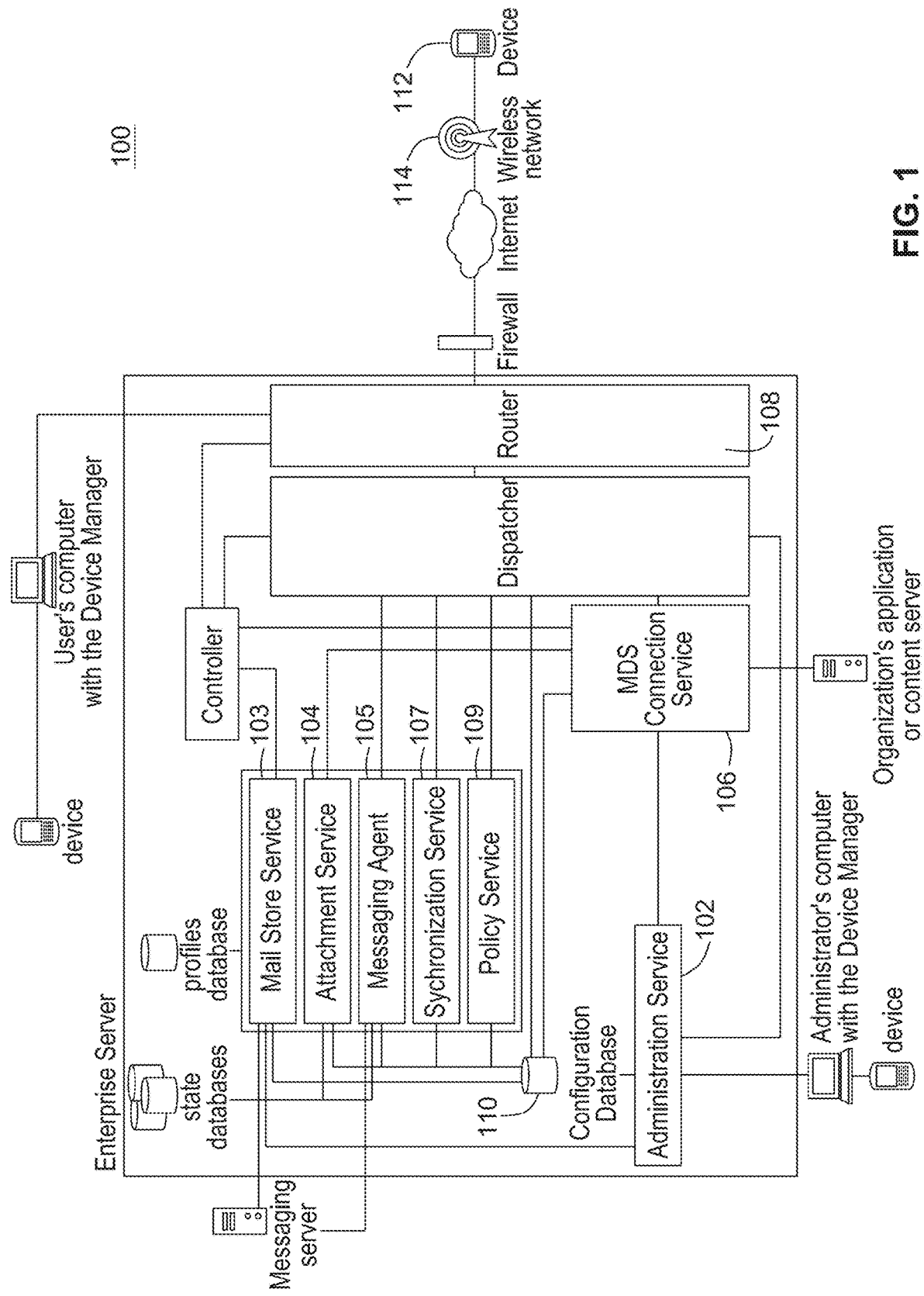
FIG. 1 is a block diagram showing a single platform device management system.

In the present description, like numerals refer to like structures or functions in the drawings.

The present disclosure describes a unitary management console with a user interface (UI) for use in an enterprise network that might include multiple domains corresponding to wireless device management systems. The unitary management console interfaces with multiple domains and associated management systems for device management actions directed to differing groups and types of mobile devices. It thereby provides dynamic and real-time management of mobile devices in the multiple domains from a common management UI implemented as a single web-based console. IT administrators are provided with a simple and efficient way to distribute software and manage policies, inventory, security and services for mobile devices.

Furthermore, the present system avoids errors or synchronization of user accounts and their associated devices across disparate management systems by not employing or storing information in a separate database to those of the management systems. Instead the present system issues a query to the multiple domains in order to extract and then generate a consolidated list of the most current user and device information. Administrative tasks are therefore performed on this most current information without a need to update or maintain a list of consolidated users on a separate database. A common problem associated with systems implementing a separate database is the need to match user/device records retrieved from the separate systems to records stored in the separate database, requiring a mapping of the fields in between various databases to be maintained and updated whenever a new management system is added or when an existing management system database is upgraded. Furthermore, the present system provides for various tasks, such as implementing or updating IT policies, provisioning devices etc, to be distributed across all domains or selectively focused on a specific domain.

Accordingly, the present disclosure provides a system for managing multiple wireless devices comprising: multiple domains each having a particular type of wireless device management system and respective application programming interfaces "APIs"; API call modules corresponding to each domain for accessing the API's exposed by each of the respective domains; and a management console for compiling a consolidated list of devices and users from each of the systems requested via the API call modules.

There is further provided a method for managing multiple wireless devices comprising: querying multiple domains to obtain device user information; compiling a consolidated list of users from said querying; selecting a user from the consolidated list; and submitting a command to either all or a specific domain for the selected user.

Referring to FIG. 1 there is shown a single platform or domain device management system 100 and a collection of related service components. The system 100 comprises various service components such as an administration service 102, mail store service 103, attachment service 104, messaging agent 105, synchronization service 107, policy service 109, mobile data software connection service (MDS-CS) 106, router 108, a configuration database 110 and one or more devices 112 which may connect through cellular network 114 to provide either voice or data services. Various functions and services of the management system are exposed or made available through appropriate APIs.

An enterprise network may include several different types of management systems and their associated service components similar to the single system as exemplified in FIG. 1. In the present description, a "domain" is defined as a one of different types or classes of device management systems and a collection of the related service components such as the administration service, attachment server, mobile data software connection service (MDS-CS), router, a configuration database and one or more devices. A domain can contain only one type or class of management system but can contain one or multiple instances of each. For example, different domains may support different operating systems and or device types.

Figure 2:
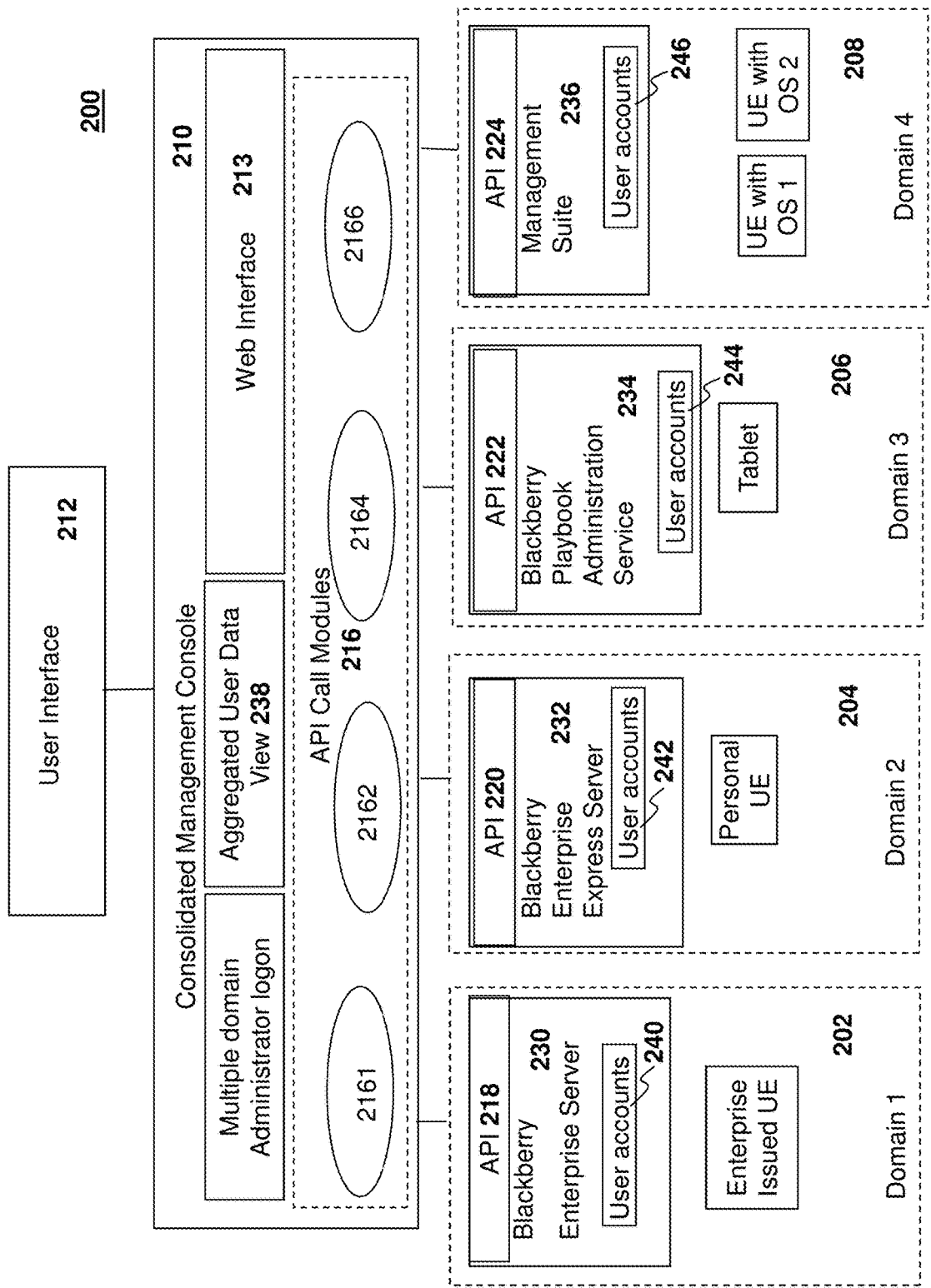
FIG. 2 is a block diagram showing a multiplatform management system according to an embodiment of the present disclosure.

Referring now to FIG. 2 there is shown a block diagram of an exemplary multiplatform management system 200 according to an embodiment of the present disclosure. The system 200 comprises a plurality of domains 202, 204, 206 and 208 in communication with a consolidated management console 210 having a single user interface 212 communicating through a web interface 213 to enable management and control of the multiple different domains 202, 204, 206 and 208 and the associated different device types (e.g., enterprise issued user equipment, personal user equipment, tablet, and/or user equipment with first or second operating systems). Each of the multiple domains has a particular type of management system 230, 232, 234 and 236. The consolidated management console 210 includes task based API call modules 2161, 2162, 2164 and 2166 corresponding to each domain for accessing the APIs 218, 220, 222 and 224 exposed by each of the respective domains 202, 204, 206 and 208. The API call modules 2161, 2162, 2164 and 2166 respond to various task requests instructed by an Administrator through the user interface 212. The domain APIs provide a direct channel of communication into the configuration database through which a user can obtain representations of the objects in the management system. When requested, the domain API retrieves an object or objects from the appropriate services and configuration databases in the management system and provides the requestor with the appropriate information. The domain APIs may also be used to access functions of the respective management systems. The management systems have one or more accounts corresponding to one or more devices.

In the illustrated embodiment of FIG. 2, the consolidated management console with the single user interface is deployed in the enterprise network so as to communicate with the multiple different types of domains. In this exemplary enterprise network, the deployed domains are: a BlackBerry Enterprise Server ("BES") domain 202, a BlackBerry Enterprise Server Express domain 204, a BlackBerry PlayBook Administration Service domain 206, and a BlackBerry Universal Device Service or ubi-Suite domain 208. However, these are merely meant as examples, and in other embodiments, different domains from different vendors may equally be used.

The consolidated management console includes an aggregated user/device data view module 238 for compiling a consolidated list of devices and users requested from each of the systems. The consolidated management console provides a task based environment for allowing administrators to perform common administrative tasks via the UI 212 against the consolidated list of users of different devices such as BlackBerry devices, PlayBook tablets, Apple iPhones, Android-based devices, etc. across multiple domains.

The aggregated user/device data view module 238 is able to pool the user's multiple management system accounts 240, 242, 244 and 246 into a single "view" for presentation to the user interface 212 while still treating the accounts as different objects, and can provision and manage them separately and differently (e.g., with different policies, permissions and usage guidelines) as will be described below.

In the example illustrated in FIG. 2, a BES domain 202 is associated with a group of enterprise issued mobile devices that operate with a full feature set. The BES Express domain 204 is associated with a group of mobile devices that may be personalized. The BlackBerry PlayBook Administration Service domain 206 is associated with a group of PlayBook tablets, and the BlackBerry Universal Device Service or ubi-Suite domain 208 is associated with devices having, for example, the iOS operating system or the Android operating system.

A user can have multiple managed devices operating in the enterprise network. These devices are managed or administered by multiple different management system deployments (e.g. BES, BES Express, BlackBerry PlayBook Administration Server and BlackBerry Universal Device Service or ubi-Suite). Typically, one device is only managed by one management system deployment, but one management system deployment can manage multiple devices for the same/single user.

Referring now to FIG. 3, the figure shows a method for multiplatform management 300 according to an embodiment of the present disclosure. Initially an administrator or similar user performs a logon 302 onto the consolidated management console via the UI 212 accessed, in one embodiment, through the console web interface 213. The console 210 may pass the logon information onto the various domains for authentication or may perform such authentication locally. Once the administrator is authenticated, the console performs a logon 304 onto all the domains 202, 204, 206 and 208 and issues a query 306 through the respective domain APIs 218, 220, 222 and 224 for a list of information on users and associated devices. Upon receipt of the lists the console 210 compiles 308 the received lists into a consolidated list and displays 310 the consolidated list on the UI 212.

Referring to FIG. 4, the figure shows a method for multiplatform management 400 using the displayed consolidated list obtained at block 310 of FIG. 3. The logged on administrator selects 402 from the displayed consolidated list a particular user or user's device to manage. An example screen 600 showing the display of a consolidated list of users is shown in FIG. 6.

As shown in the example screen 600 of FIG. 6, the user can be represented by a name and/or email address. Further, the example screen 600 of FIG. 6 lists multiple rows of users, and columns that present, in addition to user name and email address, a domain, a device model, a device personal identification number (PIN) and date and time of last user contact or activity as associated with the particular user.

Referring to FIG. 4, the administrator then performs one or more tasks on the selected user 404. In the case illustrated in FIG. 6, the user "Paul Morley" 604 appears in two domains 606, 607 with respective devices in the domains. Referring to FIG. 4, the console then selects the appropriate commands based on the tasks selected by the administrator and determines 406 whether the commands are to be sent to all domains 408 or to a specific domain 410. Details for each of the domains in which the user appears may be displayed as shown in the example screen shots 700 and 800 of FIG. 7 and FIG. 8, respectively.

The administrator may take administrative actions and perform device management of the different types of devices directly from the single user interface of the consolidated management console. Thus, the administrator can seamlessly manage a single user from one amalgamated view of a user in the consolidated management console providing discrete management capabilities over each of the different device types via the disparate management systems across the multiple domains.

Within each of management system deployments 230, 232, 234 and 236, a mechanism is employed to identify the user, the user's device(s), and to link the user to his devices. In one embodiment an identifier is used to identify an entity such as a user, device, etc. The identifier may have the following characteristics or attributes:

The identifier has meaning in many management systems.
The identifier is globally unique, meaning there is no confusion and it would identify the person uniquely in any system.
The identifier is durable and relevant for a long time.

In an embodiment, an email address is used as the globally unique identifier for the user as it has been found that all domains have available at least some form of email address associated with a user in the domain. Thus, the user interface displays aggregate data for a single person from multiple management system deployments. For example in order to show the information for a specific user Joe Doe (and not any and all users Joe Doe), the console separately queries each deployed device management system to retrieve the details for the specific Joe Doe. A Joe Doe is identified to each device management system by associating with each user an identifier that is recognizable and usable by all the device management systems.

By having a uniformly accepted identifier such as an email address, the consolidated management system may manage details for a single person supplied by a single management system to aggregated details for the same person, with data from all or multiple management systems. However, if multiple, different identifiers are used because some of the management systems accept some but not others (e.g. SIN/SSN, health card, driver license), then a way to translate the "foreign" identifier from one system into the "native" and acceptable identifier within each target system may be provided.

Based on these considerations, the email address is suitable as the globally unique identifier for the user, since:
It is already widely and intuitively understood even by non-IT people as identifying a person
Not everyone may have an email address but nevertheless can be easily assigned email addresses
Email addresses are commonly available in many systems, if not for identification then for some other purpose.

In other words, this unique identifier should exist and be common across each of the user's "accounts" on the disparate management systems in order to ensure that in fact the system is consolidating two or more records from the disparate backend management systems into a single consolidated view representing the actual singular user, e.g. Paul Morley, when managing from a common management UI. Each of the users accounts might have the same email identifier ("name@sample-enterprise") associated with each of the user's devices (e.g., BlackBerry device, PlayBook tablet, and Apple iPhone) on each of the different management systems. The use of an email address is not meant to be limiting, but is provided for illustrative purposes.

In one embodiment, each of the device management systems within a given domain in the enterprise network includes a web services interface. The web services interface is a means through which other servers and devices exchange data and communicate with the management system. Such web services enable incompatible and disparate software systems to interoperate. The consolidated management console may communicate using web services calls to the appropriate APIs of each of the management systems through the web services interface of the particular management system. The consolidated management console communicates via standard web services calls to the web services interface of the management system.

Figure 5:
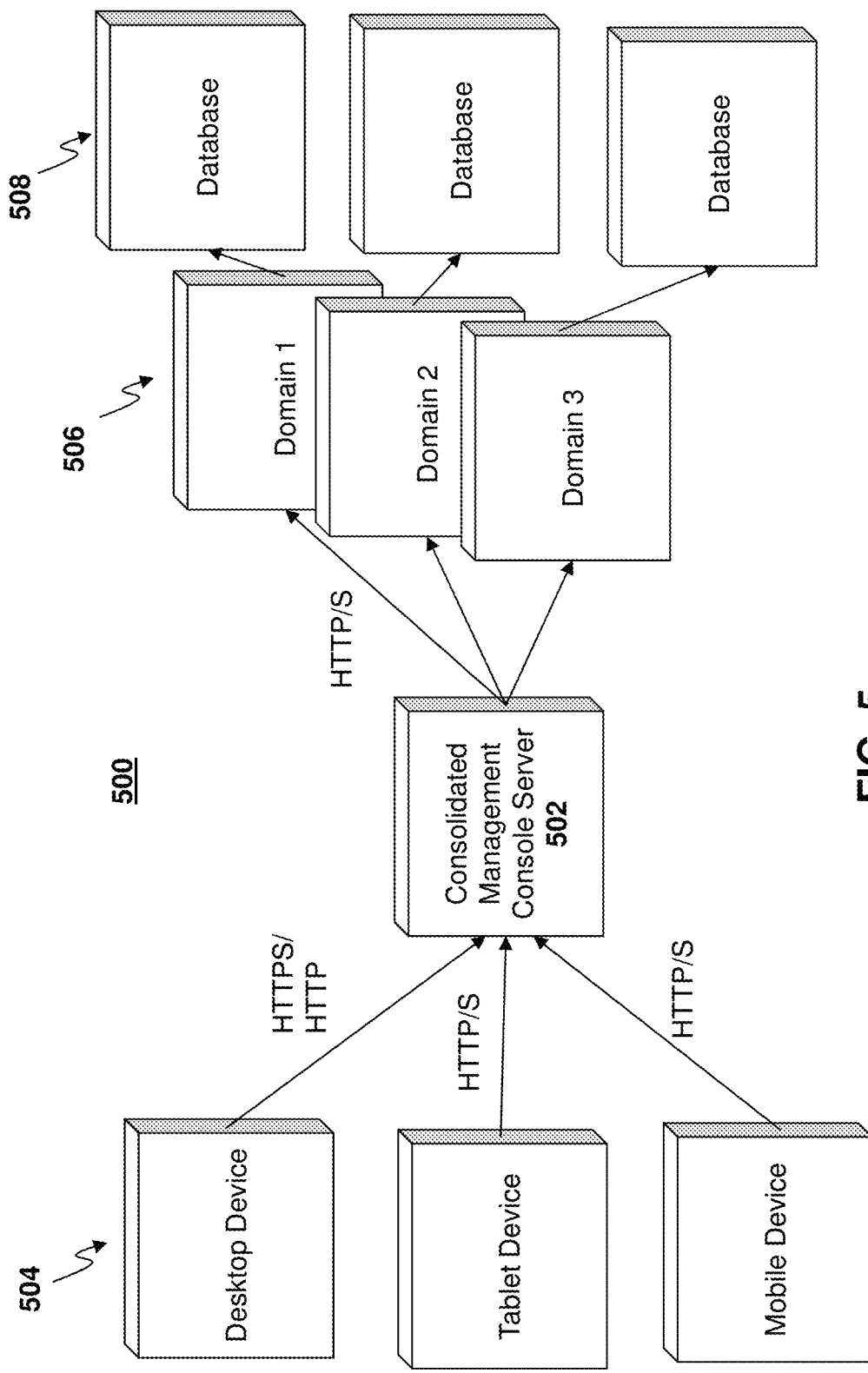
FIG. 5 is a block diagram showing a deployment of the multiplatform management system according to an embodiment of the present disclosure.

Referring to FIG. 5 there is shown a deployment diagram 500 for the system 200 according to an embodiment of the present disclosure. As illustrated the consolidate management system 200 may be deployed on a server 502 and communicate with various input devices 504 over a secure hypertext transport protocol (HTTPS) or HTTP protocol. Similarly the consolidated management server 502 may communicate with the various domains 506 using HTTP/S protocol. The domains in turn may communicate with their respective databases 508 over a dedicated secure connection.

In accordance with the present disclosure, any network element, including mobile devices and other equivalent technology, could be used to perform the methods described herein. In general, such network element will include a communications subsystem to communicate with other network elements, a processor and memory which interact and cooperate to perform the functionality of the network element.

Figure 9:
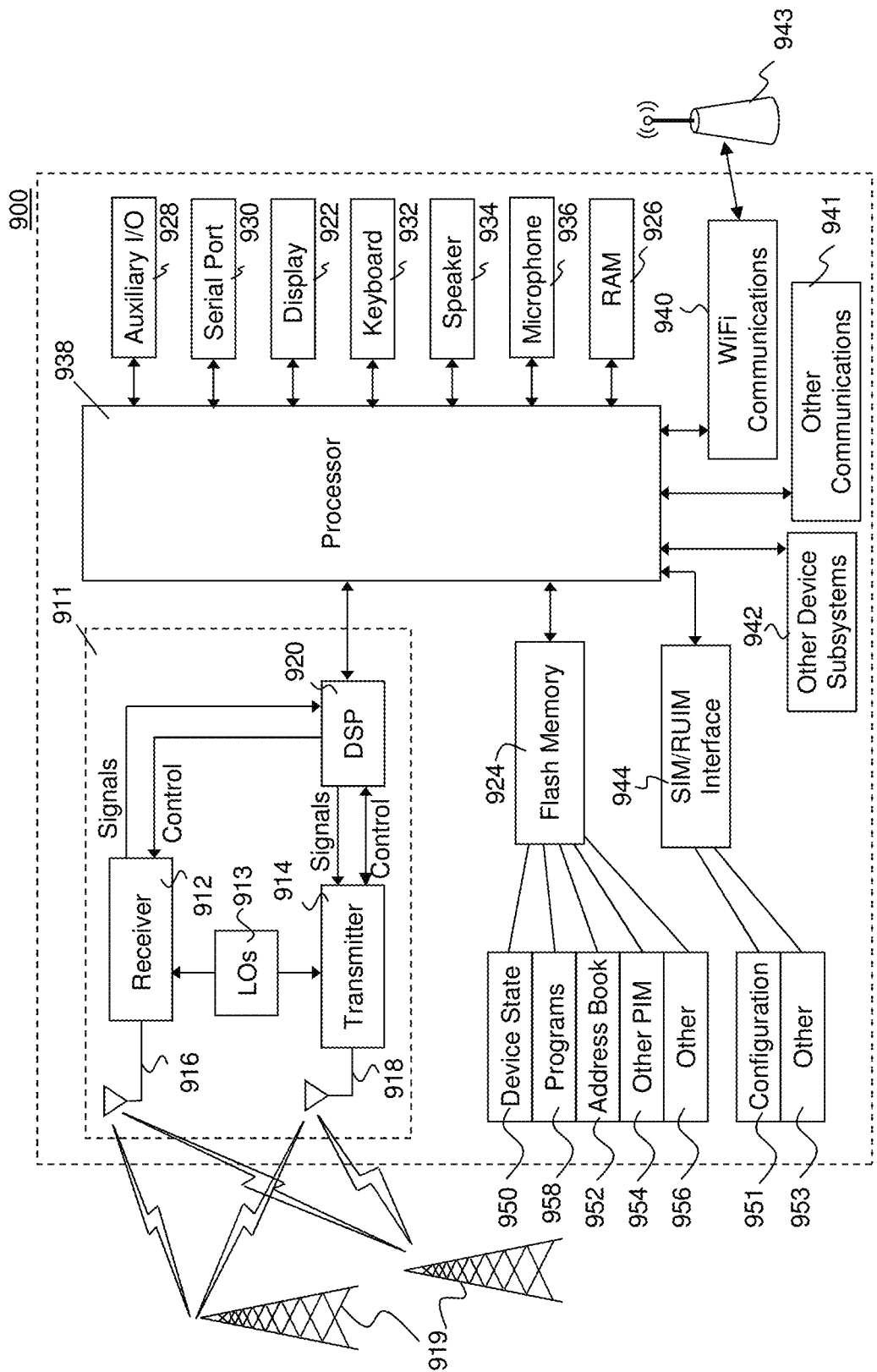
FIG. 9 is a block diagram of an exemplary mobile device.

Further, if the network element is a mobile device, any mobile device may be used. One exemplary mobile device is described below with reference to FIG. 9. The use of the mobile device of FIG. 9 is not meant to be limiting, but is provided for illustrative purposes.

Mobile device 900 is a two-way wireless communication device. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile device 900 is enabled for two-way communication, it can incorporate a communication subsystem 911, including both a receiver 912 and a transmitter 914, as well as associated components such as one or more, antenna elements 916 and 918, local oscillators (LOs) 913, and a processing module such as a digital signal processor (DSP) 920. The particular design of the communication subsystem 911 depends upon the communication network in which the device is intended to operate.

When required network registration or activation procedures have been completed, mobile device 900 may send and receive communication signals over the network 919. As illustrated in FIG. 9, network 919 can comprise multiple base stations communicating with the mobile device.

Signals received by antenna 916 through communication network 919 are input to receiver 912, which may perform such common receiver functions as signal amplification, frequency down conversion, filtering, channel selection and the like, and in the example system shown in FIG. 9, analog to digital (A/D) conversion. A/D conversion of a received signal allows more complex communication functions such as demodulation and decoding to be performed in the DSP 920. In a similar manner, signals to be transmitted are processed, including modulation and encoding for example, by DSP 920 and input to transmitter 914 for digital to analog conversion, frequency up conversion, filtering, amplification and transmission over the communication network 919 via antenna 918. DSP 920 not only processes communication signals, but also provides for receiver and transmitter control. For example, the gains applied to communication signals in receiver 912 and transmitter 914 may be adaptively controlled through automatic gain control algorithms implemented in DSP 920.

Network access requirements will also vary depending upon the type of network 919. In some networks network access is associated with a subscriber or user of mobile device 900. A mobile device may require a removable user identity module (RUIM) or a subscriber identity module (SIM) card in order to operate on a network. The SIM/RUIM interface 944 is normally similar to a card-slot into which a SIM/RUIM card can be inserted and ejected. The SIM/RUIM card holds many key configurations 951, and other information 953 such as identification, and subscriber related information.

Mobile device 900 includes a processor 938 which controls the overall operation of the device. Communication functions, including at least data and voice communications, are performed through communication subsystem 911. Processor 938 also interacts with further device subsystems such as the display 922, flash memory 924, random access memory (RAM) 926, auxiliary input/output (I/O) subsystems 928, serial port 930, one or more keyboards or keypads 932, speaker 934, microphone 936, other communication subsystem 940 such as a short-range communications subsystem and any other device subsystems generally designated as 942. Serial port 930 could include a USB port or other port known to those in the art.

Some of the subsystems shown in FIG. 9 perform communication-related functions, whereas other subsystems may provide "resident" or on-device functions. Notably, some subsystems, such as keyboard 932 and display 922, for example, may be used for both communication-related functions, such as entering a text message for transmission over a communication network, and device-resident functions such as a calculator or task list.

Operating system software used by the processor 938 can be stored in a persistent store such as flash memory 924, which may instead be a read-only memory (ROM) or similar storage element (not shown). Specific device applications, or parts thereof, may be temporarily loaded into a volatile memory such as RAM 926. Received communication signals may also be stored in RAM 926.

As shown, flash memory 924 can be segregated into different areas for both computer programs 958 and program data storage 950, 952, 954 and 956. These different storage types indicate each program can allocate a portion of flash memory 924 for their own data storage requirements. Processor 938, in addition to its operating system functions, can enable execution of software applications on the mobile device. A predetermined set of applications which control basic operations, including at least data and voice communication applications for example, will normally be installed on mobile device 900 during manufacturing. Other applications could be installed subsequently or dynamically.

A software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application can have the ability to send and receive data items, via the wireless network 919. In an embodiment, the PIM data items are seamlessly integrated, synchronized and updated, via the wireless network 919, with the mobile device user's corresponding data items stored or associated with a host computer system. Further applications may also be loaded onto the mobile device 900 through the network 919, an auxiliary I/O subsystem 928, serial port 930, short-range communications subsystem 940 or any other suitable subsystem 942, and installed by a user in the RAM 926 or a non-volatile store (not shown) for execution by the microprocessor 938. Such flexibility in application installation increases the functionality of the device and may provide enhanced on-device functions, communication-related functions, or both.

In a data communication mode, a received signal such as a text message or web page download will be processed by the communication subsystem 911 and input to the microprocessor 938, which further processes the received signal for element attributes for output to the display 922, or alternatively to an auxiliary I/O device 928.

A user of mobile device 900 may also compose data items such as email messages for example, using the keyboard 932, which can be a complete alphanumeric keyboard or telephone-type keypad, in conjunction with the display 922 and possibly an auxiliary I/O device 928. Such composed items may then be transmitted over a communication network through the communication subsystem 911.

For voice communications, overall operation of mobile device 900 is similar, except that received signals would be output to a speaker 934 and signals for transmission would be generated by a microphone 936. Alternative voice or audio I/O subsystems, such as a voice message recording subsystem, may also be implemented on mobile device 900. Although voice or audio signal output is accomplished primarily through the speaker 934, display 922 may also be used to provide an indication of the identity of a calling party, the duration of a voice call, or other voice call related information for example.

Serial port 930 in FIG. 9 would normally be implemented in a personal digital assistant (PDA)-type mobile device for which synchronization with a user's desktop computer (not shown) may be desirable, but is an optional device component. Such a port 930 would enable a user to set preferences through an external device or software application and would extend the capabilities of mobile device 900 by providing for information or software downloads to mobile device 900 other than through a wireless communication network. The alternate download path may for example be used to load an encryption key onto the device through a direct and thus reliable and trusted connection to thereby enable secure device communication. Serial port 930 can further be used to connect the mobile device to a computer to act as a modem.

WiFi Communications Subsystem 940 is used for WiFi Communications and can provide for communication with access point 943.

Other communications subsystem(s) 941, such as a short-range communications subsystem, are further components that may provide for communication between mobile device 900 and different systems or devices, which need not necessarily be similar devices. For example, the subsystem(s) 941 may include an infrared device and associated circuits and components or a Bluetooth™ communication module to provide for communication with similarly enabled systems and devices.

The embodiments described herein are examples of structures, systems or methods having elements corresponding to elements of the techniques of the present application. The above written description may enable those skilled in the art to make and use embodiments having alternative elements that likewise correspond to the elements of the techniques of the present application. The intended scope of the techniques of the above application thus includes other structures, systems or methods that do not differ from the techniques of the present application as described herein, and further includes other structures, systems or methods with insubstantial differences from the techniques of the present application as described herein.

The invention claimed is:

1. A management console comprising:
   an API call module for accessing each of a respective plurality of domains, each of the plurality of domains having a respective application programming interface (API) for managing devices having a device type associated to their respective domain; and
   an interface to the API call module configured to submit an input query via the API call module to each of the respective API's of each of the plurality of domains, the interface further configured to receive a plurality of user information from the queried domains and to consolidate the received user information associated with respective users common to the plurality of domains;
   wherein each device is associated to at most a single domain.

2. The management console of claim 1, including one or more processors configured to execute the management console and the plurality of API call modules.

3. The management console of claim 1, the user information including authorizations for access to applications.

4. The management console of claim 1, wherein the devices are one or more of wireless devices and desktop computers.

5. The management console of claim 1, the domains having respective different operating systems devices.

6. The management console of claim 1, the domains including identifiers for identifying entities managed by the domain.

7. The management console of claim 6, the identifier being a user account on the domain.

8. The management console of claim 6, the management console using the identifier to compile the consolidated list.

9. The management console of claim 8, the management console associating the identifier to a list of devices for a user.

10. The management console of claim 6 the management console grouping similar identifiers for display on a user interface.

11. The management console of claim 10, wherein the API call modules respond to task requests instructed by an administrator through the user interface.

12. A method for managing devices, the method comprising:
    instructing an API call module for accessing each of a respective plurality of domains, each of the plurality of domains each having a respective application programming interface (API) for managing devices having a device type associated to their respective domain;
    submitting via an interface to the API call module an input query to each of the respective API's of each of the plurality of domains;
    receiving via the interface a plurality of user information from the queried domains;
    consolidating the received user information associated with respective users common to the plurality of domains; and
    displaying the consolidated list in a user interface
    wherein each device is associated to at most a single domain.

13. The method of claim 12, including selecting a user from the consolidated list.

14. The method of claim 13, including submitting a command to either all or a specific domain for the selected user.

15. The method of claim 14, including determining whether the command is for a specific domain or group of domains.

16. The method of claim 14, including performing device management of multiple devices of the selected user based on the command.

17. The method of claim 12, including identifying entities managed within a domain by an identifier.

18. The method of claim 17, the identifier being a user account.

19. The method of claim 18, the user account being an email address.

20. The method of claim 12, including determining whether an identifier exists for a user and if not creating a unique identifier for the user.

21. The method of claim 12, including selecting a user domain from the consolidated list.

22. A non-transitory computer-accessible medium having a sequence of instructions which, when executed by a processing entity, effectuate management of devices, the non-transitory computer-accessible medium comprising:
    a code portion for instructing an API call module for accessing each of a respective plurality of domains, each of the plurality of domains each having a respective application programming interface (API) for managing devices having a device type associated to their respective domain;
    a code portion for submitting via an interface to the API call module an input query to each of the respective API's of each of the plurality of domains;
    a code portion for receiving via the interface a plurality of user information from the queried domains and consolidating the received user information associated with respective users common to the plurality of domains; and a code portion for displaying the consolidated list in a user interface;

wherein each device is associated to at most a single domain.

* * * * *